(12) United States Patent
Yang et al.

(10) Patent No.: US 8,158,100 B2
(45) Date of Patent: Apr. 17, 2012

(54) METHOD AND COMPOSITION FOR PREPARATION OF HYDROGEN PEROXIDE

(75) Inventors: Se In Yang, Suwon-si (KR); Kyung Keun Yoo, Seoul (KR); Yong Il Kim, Incheon (KR); Tae Hee Shin, Seoul (KR); Deok Yun Kim, Seongnam-si (KR); Sun Ki Seo, Iksan-si (KR); Rae Sung Chung, Iksan-si (KR); Do Sun Baik, Iksan-si (KR)

(73) Assignee: OCI Company Ltd., Seoul (KR)

( * ) Notice: Subject to any disclaimer, the term of this patent is extended or adjusted under 35 U.S.C. 154(b) by 0 days.

(21) Appl. No.: 12/811,664

(22) PCT Filed: Mar. 6, 2009

(86) PCT No.: PCT/KR2009/001135
§ 371 (c)(1),
(2), (4) Date: Jul. 2, 2010

(87) PCT Pub. No.: WO2010/011010
PCT Pub. Date: Jan. 28, 2010

(65) Prior Publication Data
US 2010/0284901 A1    Nov. 11, 2010

(30) Foreign Application Priority Data
Jul. 22, 2008    (KR) .......................... 10-2008-0071270

(51) Int. Cl.
*C01B 15/023*    (2006.01)
(52) U.S. Cl. .................................. 423/588; 252/182.12
(58) Field of Classification Search .................... 423/588
See application file for complete search history.

(56) References Cited

U.S. PATENT DOCUMENTS 3,073,680 A    1/1963  Jenney et al.
3,540,847 A    11/1970 Logan
(Continued)

FOREIGN PATENT DOCUMENTS

EP    1101733    5/2001
(Continued)

OTHER PUBLICATIONS

International Preliminary Report on Patentability for PCT/KR2009/001135.

(Continued)

*Primary Examiner* — Melvin C Mayes
*Assistant Examiner* — Melissa Stalder
(74) *Attorney, Agent, or Firm* — Lowe Hauptman Ham & Berner LLP

(57) ABSTRACT

The present invention relates to a method for the preparation of hydrogen peroxide through a continuous process, extracting hydrogen peroxide produced from reduction and oxidation of a working solution and recycling the oxidized working solution back to the reduction process, wherein the composition of the working solution, i.e. the composition of 2-alkylanthraquinone and 2-tetrahydroalkylanthraquinone, is optimized to increase the solubility of the quinones and to improve the reaction rate. The working solution comprises 2-alkylanthraquinone, 2-tetrahydroalkylanthraquinone and an organic solvent, wherein 65-95 mol % of the alkyl group of 2-alkylanthraquinone and 2-tetrahydroalkylanthraquinone is amyl and the remaining 5-35 mol % of the alkyl group is ethyl, and the molar ratio of 2-alkylanthraquinone to 2-tetrahydroalkylanthraquinone is from 4:6 to 1:9.

16 Claims, 1 Drawing Sheet

U.S. PATENT DOCUMENTS

| | | |
|---|---|---|
| 4,539,196 A | 9/1985 | Sethi et al. |
| 6,153,169 A | 11/2000 | Glenneberg et al. |
| 6,524,547 B1 * | 2/2003 | Nystrom et al. .............. 423/588 |

FOREIGN PATENT DOCUMENTS

| | | |
|---|---|---|
| JP | 06-191803 | 7/1994 |
| KR | 10-2001-0076225 | 8/2001 |
| KR | 10-2008-0007102 | 1/2008 |
| WO | 95/28350 | 10/1995 |

OTHER PUBLICATIONS

W. Eul et al., Hydrogen Peroxide, Kirk-Othmer Encyclopedia of Chemical Technology, Aug. 17, 2001, Wiley Inter Science.

International Search Report mailed Jul. 8, 2009 for PCT/KR2009/001135, citing the above references.

* cited by examiner

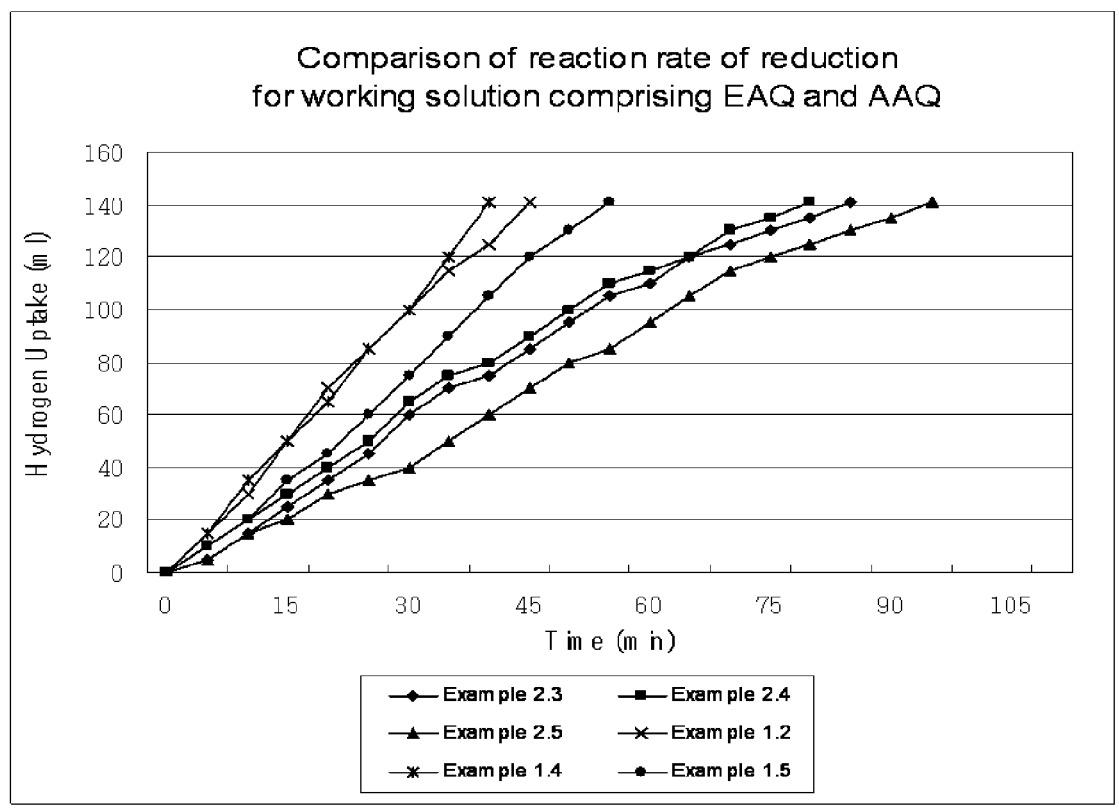

METHOD AND COMPOSITION FOR PREPARATION OF HYDROGEN PEROXIDE

CROSS REFERENCE TO RELATED APPLICATION

This application claims the priority of Korean Patent Application No. 10-2008-0071270, filed on Jul. 22, 2008 in the KIPO (Korean Intellectual Property Office), the disclosure of which is incorporated herein in their entirety by reference. Further, this application is the National Phase application of International Application No. PCT/KR2009/001135, filed Mar. 6, 2009, which designates the United States and was published in English. Each of these applications is hereby incorporated by reference in their entirety into the present application.

TECHNICAL FIELD

The present invention relates to a method for the preparation of hydrogen peroxide through a continuous process, extracting hydrogen peroxide produced from reduction and oxidation of a working solution and recycling the oxidized working solution back to the reduction process, wherein the composition of the working solution, i.e., the composition of 2-alkylanthraquinone and 2-tetrahydroalkylanthraquinone, is optimized to increase the solubility of the quinones and to improve the reaction rate.

BACKGROUND ART

At present, hydrogen peroxide is manufactured almost exclusively for commercial purposes by using alkylanthraquinone as working material. In the alkylanthraquinone process, a working solution prepared by dissolving alkylanthraquinones (alkylanthraquinone and tetrahydroalkylanthraquinone) in an organic solvent is first reacted in the presence of a catalyst with hydrogen gas to produce alkylanthrahydroquinone. When the alkylanthrahydroquinone is oxidized by air or oxygen gas back to alkylanthraquinone, hydrogen peroxide is produced. Thus produced hydrogen peroxide is extracted with water, separated, and then purified. The working solution separated through extraction is recycled for reduction, oxidation and extraction. This autoxidation cycle using alkylanthraquinone is well known in the literature (Kirk-Othmer, Encyclopedia of Chemical Technology, 4th Ed., 1993, Vol. 13, pp. 961-995).

In the autoxidation cycle, the working solution is recycled repeatedly, during which some of the alkylanthraquinone in the working solution is slowly converted into tetrahydroalkylanthraquinone and concentrated in the working solution. The composition and content of the working solution greatly affect the productivity of hydrogen peroxide, reaction rate, easiness of process operation, and production of inert ingredients from side reactions of alkylanthraquinone.

There have been many suggestions with respect to the composition of the working solution, i.e., the kind and proportion of alkylanthraquinones.

Korean Patent Publication No. 10-2008-0007102 discloses a method for preparation of hydrogen peroxide using a working solution comprising a 2:1 to 8:1 (molar ratio) mixture of 2-alkylanthraquinone (AQ) and 2-tetrahydroalkylanthraquinone (THAQ), in which 55-90 mol % of the alkyl of the total quinones is amyl and the remaining 10-45 mol % of the alkyl is ethyl. Although this patent aims at preparation of hydrogen peroxide with low impurity content, the productivity of hydrogen peroxide is not so high because the solubility of the reduced form alkylanthrahydroquinone (AHQ) is lower than that of tetrahydroalkylanthrahydroquinone (THAHQ). Further, a higher proportion of alkylanthraquinone than tetraalkylanthraquinone during the reduction results in slow hydrogenation reaction rate, which, in turn, leads to loss of alkylanthraquinone through side reactions.

U.S. Pat. No. 6,153,169 uses 2-ethylanthraquinone (EAQ) and 2-amylanthraquinone (AAQ) as well as 2-(4-methyl-3-pentenyl)-anthraquinone (IHEAQ) or 2-(4-methylpentyl)-anthraquinone (IHAQ) as working material. One of the conditions required for quinone as working material is that it should be commercially available and inexpensive. However, as mentioned also in the patent, IHEAQ and IHAQ are commercially unavailable and should be synthesized for use. Further, the cost of the raw material is much higher than that of EAQ or AAQ.

U.S. Pat. No. 6,524,547 suggests the use of a working solution comprising a mixture of 2-ethylanthraquinone and 2-amylanthraquinone, wherein the content of 2-amylanthraquinone is 10-55 mol % and the molar ratio of tetrahydroalkylanthraquinone to alkylanthraquinone is at least 1:1. However, because of the high proportion of 2-ethylanthraquinone, the solubility of alkylanthraquinone and alkylanthrahydroquinone is low and reaction rate is slow. Due to the low solubility and slow reaction rate, it is difficult to improve the productivity of hydrogen peroxide.

WO 95/28350 discloses a method for preparation of hydrogen peroxide using an all-tetra system working solution consisting of 2-tetrahydroethylanthraquinone and 2-tetrahydroamylanthraquinone. However, the productivity of hydrogen peroxide is not high because the solubility of tetrahydroalkylanthraquinone is lower than that of alkylanthraquinone. Further, a harsh reaction condition is required during the oxidation process because the oxidation reaction rate is retarded. In addition, tetrahydroalkylanthraquinone is not commercially available, and so it should be synthesized through an additional process.

Japanese Patent Laid-open No. Hei 6-191803 discloses a method for preparation of hydrogen peroxide using a working solution comprising 3:1 to 6:1 (molar ratio) of 2-amylanthraquinone (AAQ) and 2-tetrahydroamylanthraquinone (THAAQ). However, because of high alkylanthraquinone content, this method is associated with the problem of loss of alkylanthraquinone caused by side reactions of the alkylanthraquinone during reduction. Further, the productivity of hydrogen peroxide is not high since the solubility of reduced alkylanthrahydroquinone (AHQ) is less than that of tetrahydroalkylanthrahydroquinone (THAHQ).

U.S. Pat. No. 3,073,680 uses a mixture of 2-ethylanthraquinone (EAQ) and 2-tetrahydroethylanthraquinone (THEAQ). However, it is impossible to increase the concentration of EAQ and THEAQ in the working solution because they have low solubility, which is directly related with the productivity of hydrogen peroxide.

U.S. Pat. No. 3,540,847 also uses EAQ and THEAQ as a working material. However, even though the proportion of THEAQ is higher than that of EAQ, the productivity of hydrogen peroxide is merely about 6.5-11 g per liter of the working solution.

DISCLOSURE OF INVENTION

Technical Problem

The inventors of the present invention have researched to solve the aforesaid problems. As a result, they found out that the productivity of the preparation process of hydrogen peroxide can be improved through the control of the composition of 2-alkylanthraquinone and 2-tetrahydroalkylanthraquinone, the content of inert ingredients and water, and the degree of hydrogenation.

Technical Solution

In an aspect, the present invention provides a method for preparation of hydrogen peroxide through an anthraquinone recycle process of reducing and oxidizing a working solution comprising 2-alkylanthraquinone, 2-tetrahydroalkylanthraquinone and an organic solvent, wherein 65-95 mol % of the alkyl group of 2-alkylanthraquinone and 2-tetrahydroalkylanthraquinone is amyl and the remaining 5-35 mol % of the alkyl group is ethyl, and the molar ratio of 2-alkylanthraquinone to 2-tetrahydroalkylanthraquinone is from 4:6 to 1:9.

In another aspect, the present invention provides a composition for preparation of hydrogen peroxide comprising 2-alkylanthraquinone, 2-tetrahydroalkylanthraquinone and an organic solvent, wherein 65-95 mol % of the alkyl group of 2-alkylanthraquinone and 2-tetrahydroalkylanthraquinone is amyl and the remaining 5-35 mol % of the alkyl group is ethyl, and the molar ratio of 2-alkylanthraquinone to 2-tetrahydroalkylanthraquinone is from 4:6 to 1:9.

Advantageous Effects

The present invention is advantageous in that the amount of hydrogen peroxide that can be produced per liter of a working solution can be enhanced, the reduction time can be reduced, and the loss of quinone due to side reactions can be minimized through an optimized proportion of the working material quinone, inert ingredients and water in the working solution. Especially, the solubility of the reduced forms alkylanthrahydroquinone and tetrahydroalkylanthrahydroquinone can be enhanced while the reaction rate is improved, and the physical properties of the working solution including specific gravity and viscosity can be optimized, thereby facilitating the process operation.

BRIEF DESCRIPTION OF DRAWINGS

The above and other aspects, features and advantages of the disclosed exemplary embodiments will be more apparent from the following detailed description taken in conjunction with the accompanying drawings in which:

FIG. 1 is a graph showing the reaction rate of reduction depending on the composition of the working solution.

BEST MODE FOR CARRYING OUT THE INVENTION

Exemplary embodiments of the present invention will be described more fully hereinafter.

The productivity of hydrogen peroxide is proportional to gp1, that is, the quantity of hydrogen peroxide produced from 1 L of a reduced working solution. It changes depending on the concentration of the working material, the degree of hydrogenation, or the like, and is closely related with the solubility of reduced alkylanthrahydroquinone. That is to say, a higher solubility of alkylanthrahydroquinone leads to more hydrogenation, and, consequently, production of more hydrogen peroxide.

The working solution is the most important in the preparation of hydrogen peroxide. Its composition and content greatly affect the productivity of hydrogen peroxide and process operation conditions. The general requirements of the alkylanthraquinone included in the working solution are as follows. First, the oxidized form, alkylanthraquinone, and the reduced form, alkylanthrahydroquinone, should have high solubility in the used organic solvent. Further, it should be chemically stable and the reaction rate of reduction and oxidation should be high. In addition, it should not be soluble in water and hydrogen peroxide, commercially available in large scale, and inexpensive.

The alkylanthraquinone may be selected from 2-amylanthraquinone, 2-ethylanthraquinone, 2-butylanthraquinone, 2-propylanthraquinone, 2-methylanthraquinone, 2-neopentylanthraquinone, and the like. Especially, the inventors found out that, rather than a single 2-alkylanthraquinone and its corresponding 2-tetrahydroalkylanthraquinone, a use of two 2-alkylanthraquinones and their corresponding 2-tetrahydroalkylanthraquinones may provide a superior working solution.

In general, 2-amylanthraquinone is advantageous in that it has high solubility. 2-Ethylanthraquinone has low solubility, and, thus, is restricted in improving the productivity of hydrogen peroxide. But, it has a faster reaction rate of reduction than 2-amylanthraquinone, making it advantageous to be applied in the reduction process. Further, it is inexpensive.

The inventors found out that a eutectic mixture of two quinone compounds at a specific proportion may provide a much higher solubility and improved reaction rate of reduction, as compared to a single quinone. This means that a combination of 2-ethylanthraquinone and 2-amylanthraquinone at a specific proportion may provide a maximum productivity of hydrogen peroxide.

The alkylanthraquinone used in the present invention comprises 65-95 mol %, preferably 70-80 mol %, of 2-amylanthraquinone (including 2-tetrahydroamylanthraquinone) and 5-35 mol %, preferably 20-30 mol %, of 2-ethylanthraquinone (including 2-tetrahydroethylanthraquinone). The aforesaid proportion corresponds to the optimum molar ratio that provides the highest solubility and the fastest reduction rate.

2-Amylanthraquinone exists as two isomers: 2-tert-amylanthraquinone and 2-iso-sec-amylanthraquinone. Solubility, generation of side reaction products and reaction rate of reduction depend on the proportion of the amyl isomers. A preferred proportion of 2-tert-amylanthraquinone to 2-iso-sec-amylanthraquinone may be from 7:3 to 9:1.

Another important factor is the proportion of alkylanthraquinone to tetrahydroalkylanthraquinone, which is produced from its reaction. Since tetrahydroalkylanthraquinone has a better solubility in reduced form than alkylanthraquinone, it is preferable to increase its proportion with respect to the productivity of hydrogen peroxide. Tetrahydroalkylanthraquinone is not present in the initial working solution but is formed during the continuous alkylanthraquinone recycling process. Most of the formed tetrahydroalkylanthraquinone is β-tetrahydroalkylanthraquinone, but a small amount of α-tetrahydroalkylanthraquinone exists. The mechanism by which β-tetrahydroalkylanthraquinone is produced is given in Reaction Scheme 1.

[Reaction Scheme 1]

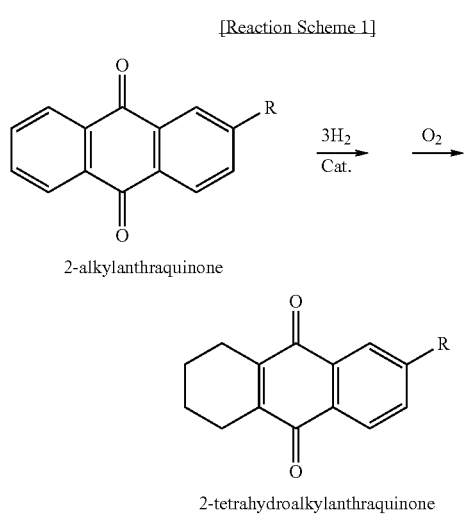

2-alkylanthraquinone 2-tetrahydroalkylanthraquinone

Tetrahydroalkylanthraquinone can improve the productivity of hydrogen peroxide because it has better solubility in reduced form and provides faster reaction rate of reduction than alkylanthraquinone [*Ind. Eng. Chem. Process Dev.* 1983, 22, 150-153]. In particular, due to the side reactions exemplified by Reaction Scheme 2, alkylanthraquinone is more susceptible to the loss of working material than tetrahydroalkylanthraquinone [Kirk-Othmer, Encyclopedia of Chemical Technology, 4th Ed, 1993, Vol. 13, pp. 961-995].

[Reaction Scheme 2]

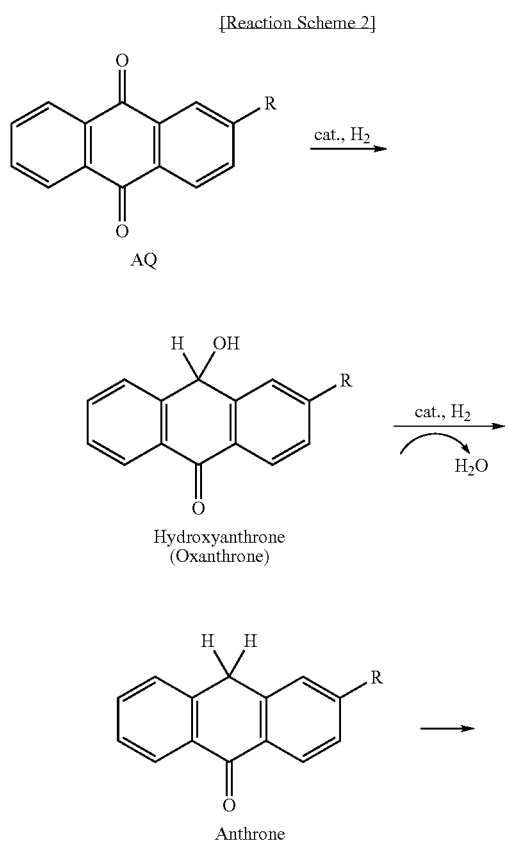

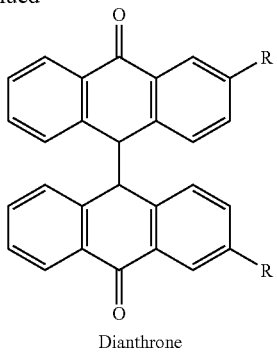

Dianthrone

In order to take advantage of higher solubility of the reduced form and to minimize loss by the side reactions, it will be desired to use tetrahydroalkylanthraquinone rather than alkylanthraquinone. However, tetrahydroalkylanthraquinone is disadvantageous in that it has lower solubility in oxidized form than alkylanthraquinone and provides slower oxidation rate in reduced form.

Accordingly, for efficient and economical preparation of hydrogen peroxide, an optimum proportion of alkylanthraquinone and tetrahydroalkylanthraquinone considering solubility, reaction rate of reduction, reaction rate of oxidation, and the like needs to be determined. Through this, the formation of side reaction products of alkylanthraquinone can be minimized as well.

The inventors found out that there exists an optimum proportion of alkylanthraquinone and tetrahydroalkylanthraquinone which provides the highest solubility of reduced hydroquinones (alkylanthrahydroquinone and tetrahydroalkylanthrahydroquinone), less generation of side reaction products and faster reaction rate. The optimum molar ratio of alkylanthraquinone to tetrahydroalkylanthraquinone is from 4:6 to 1:9, preferably from 3:7 to 2:8.

In order to maintain the optimum proportion of tetrahydroalkylanthraquinone in the working solution, it is necessary to reduce the tetrahydroalkylanthraquinone produced continuously through repeated cycles. To this end, the oxidized working solution is reacted with alumina. The mechanism by which the proportion of tetrahydroalkylanthraquinone is controlled by alumina is given in Reaction Scheme 3.

[Reaction Scheme 3]

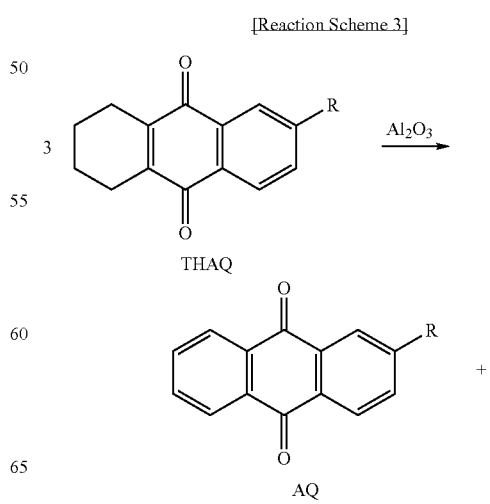

-continued

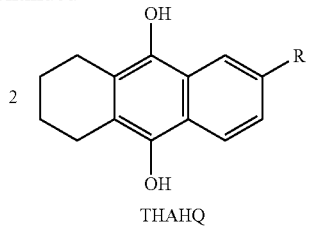

THAHQ

In the present invention, the productivity of hydrogen peroxide per volume of the working solution can be maximized by increasing the concentration of total quinones in the working solution within the limit allowed by the physical properties of the working solution, including solubility, specific gravity, viscosity, and the like. Particularly, the concentration of total quinones is restricted by the specific gravity of the working solution. Above a predetermined concentration, specific gravity increases, thereby decreasing the distribution coefficient. As a result, it is difficult to separate hydrogen peroxide from the working solution during the extraction process. Further, the increased quinone concentration is accompanied by the increase of viscosity of the working solution, which results in increased pressure difference during filtration after the reduction, which, in turn, results in increased load on the transfer pump and difficult in process operation. In the present invention, a preferred concentration of total quinones, i.e. alkylanthraquinone and tetrahydroalkylanthraquinone, in the working solution is 17-34 wt %, preferably 20-25 wt %.

The composition of active quinones in the working solution and the mechanism by which hydrogen peroxide is produced according to the present invention are given in Reaction Scheme 4.

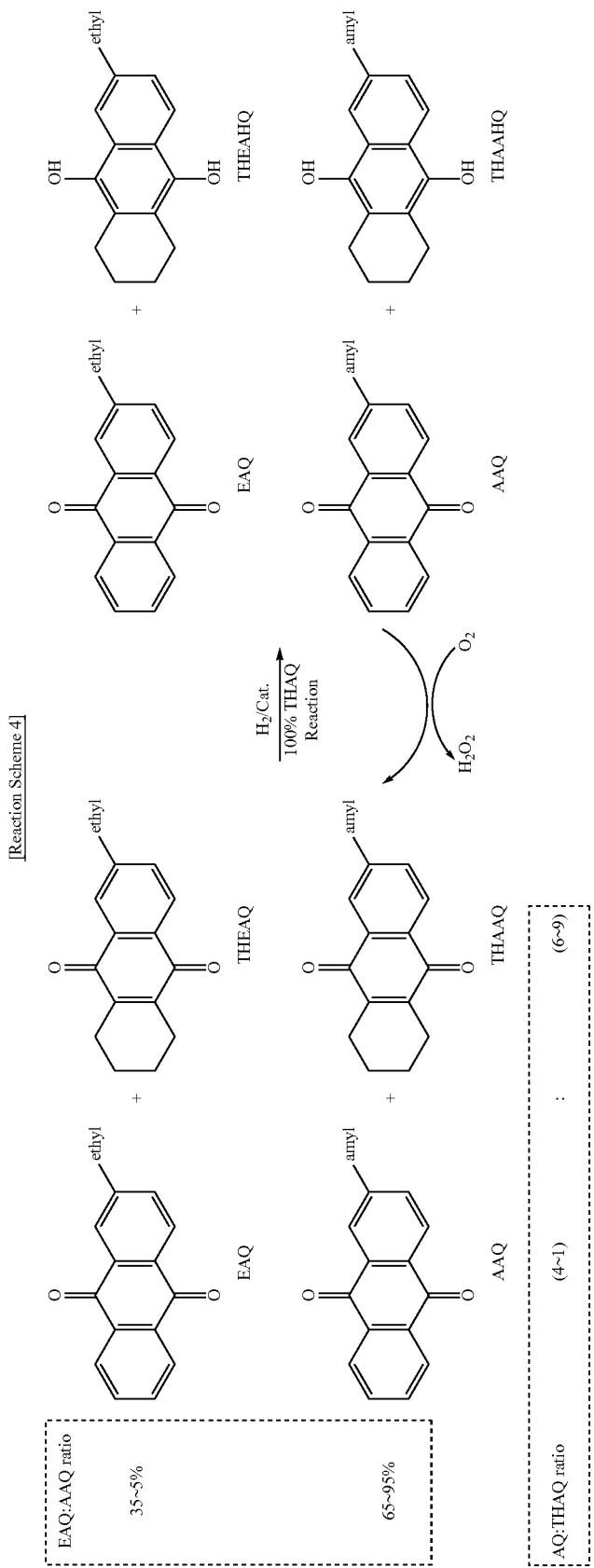

Another important feature of the present invention is that inert ingredients (inerts), or the side reaction products of alkylanthraquinone, are included in the working solution. As used herein, inert ingredients refer to the side reaction products produced as the working material quinones are degraded while the working solution is recycled. The inert ingredients are mostly the substances that cannot produce hydrogen peroxide. For example, anthrone, dianthrone, or the like are included. The content of the inert ingredients is determined as the content excluding the solvent and quinones from the working solution. The formation of the inert ingredients results in the loss of quinones. Surprisingly, however, the inventors found out that they increase the solubility of alkylanthraquinone and its reduced counterpart alkylanthrahydroquinone in the working solution. Further, the inventors found out that the inert ingredients improve reaction rate of reduction, thereby reducing the reduction time. This means that the presence of the inert ingredients outstandingly contribute to the improvement of productivity of hydrogen peroxide. But, the inert ingredients improve the productivity of hydrogen peroxide only up to a certain level, and they reduce the productivity of hydrogen peroxide when they are accumulated over a critical level. Further, they may result in the deterioration of the quality of hydrogen peroxide because of increased total organic content (TOC). In addition, they may result in the change of the physical properties of the working solution, including specific gravity, viscosity, and so on, thereby negatively affecting the process operations during catalyst filtration following the reduction and hydrogen peroxide extraction. In accordance with the present invention, the inert ingredients are present in the working solution in an amount of 3-20 wt %, preferably 5-13 wt %.

For the solvent for preparation the working solution, a combination of a nonpolar solvent that dissolves alkylanthraquinone and a polar solvent that dissolves alkylanthrahydroquinone is used. The requirements for the solvent are as follows. It should dissolve alkylanthraquinone and alkylanthrahydroquinone well, be chemically stable under repeated reduction and oxidation, have lower solubility for water and hydrogen peroxide, and have a difference of specific gravity of at least 0.03 from water. Further, it should have low volatility, high boiling point and flashing point, high hydrogen peroxide distribution coefficient in the solvent-water system, and low toxicity.

The organic solvent may be a mixture of a nonpolar solvent, $C_9$-$C_{10}$ alkylbenzene (including polyalkylbenzene), and at least one polar solvent selected from a group consisting of diisobutylcarbinol, tris-(2-ethylhexyl)phosphate, methylcyclohexyl acetate, N-butylcaprolactam and tetrabutylurea. The polar solvent is included in the total solvent in an amount of preferably 20-50 wt %, more preferably 25-40 wt %.

In the present invention, the working solution consisting of the active quinones, the inert ingredients and the solvent has a specific gravity of 0.890-0.970, preferably 0.910-0.940, at 30° C.

The catalyst that can be used in the reduction can be selected from nickel, palladium, platinum, rhodium, gold, etc. Palladium, platinum, and so on are preferred. Alumina, alumina silicate, carbon, silicate ($SiO_2$), and so on can be used as a support. In case palladium (Pd) is used as the catalyst, a carbon support provides good reactivity and selectivity, but after the reaction it can be difficult to separate the catalyst from the working solution. A use of the palladium catalyst on an alumina support provides good reactivity and selectivity and easy separation from the working solution. Thus, it is appropriated for industrial-scale production of hydrogen peroxide. Preferably, a catalyst prepared by 2.0 wt % of palladium on an alumina support having a particle diameter of 10-100 μm, an average particle diameter of 40-60 μm and a pore volume of 0.4-1.0 mL/g is used.

The inventors found out that the reduction proceeds very quickly when the working solution contains water within a predetermined range. The presence of water in the working solution increases the reactivity and selectivity of the catalyst. It is contained in the working solution in an amount of 0.05-0.5 wt %, preferably 0.1-0.35 wt %. When the water content exceeds 0.5 wt %, the excess water may result in the aggregation of the catalyst which causes the decrease of the reaction rate of reduction.

The reduction is performed preferably at 30-80° C., more preferably at 40-60° C., under a hydrogen gas pressure of 7-89 psig, more preferably 15-52 psig, in the presence of the catalyst. In order to minimize the generation of side reaction products, which is one of the features of the present invention, not only the quinone composition but also the degree of hydrogenation based on the total quinones in the reduction process is important. In the present invention, the degree of hydrogenation is within 70-100 mol %, preferably within 80-90 mol % of the total tetrahydroalkylanthraquinone. When the degree of hydrogenation exceeds 100 mol % of the total tetrahydroalkylanthraquinone, alkylanthraquinone may participate in the reaction, thereby leading to degradation of the active quinones through side reactions. Meanwhile, when the degree of hydrogenation is below 70 mol %, the productivity of hydrogen peroxide decreases.

The oxidation process by which hydrogen peroxide is produced also greatly affects the productivity of hydrogen peroxide. Therefore, a quantitative reaction should be performed when the reduced tetrahydroalkylanthrahydroquinone is oxidized to tetrahydroalkylanthraquinone. Otherwise, side reaction products such as epoxide may be formed as inert ingredients during the oxidation process, and the remaining tetrahydroalkylanthrahydroquinone what is not completely oxidized may result in not only decreased productivity but also declined extraction and reduction efficiencies.

Preferably, an oxidation tower equipped with a tray having fine pores is used as oxidation reactor. The oxidation process is carried out preferably at 30-80° C., more preferably at 40-60° C. An oxygen-containing gas is reacted at a pressure of preferably 15-150 psig, more preferably 45-104 psig.

In the method for preparation of hydrogen peroxide through recycling of the working solution, the inert ingredients produced from the side reaction of the active quinones are accumulated in the working solution as time goes by. When the inert ingredients are accumulated in the working solution by more than 20 wt %, the quality of hydrogen peroxide and the process operation may be negatively affected, in addition to the loss of alkylanthraquinone. Therefore, some of the working solution is regenerated before or after the reduction in order to convert the inert ingredients into the active quinones and to remove other impurities. During the regeneration process, a variety of porous absorbents may be used. As porous absorbents, α-Alumina, γ-alumina and alkalinated γ-alumina are very effective for the regeneration of the working solution. These aluminas regenerate or adsorb the inert ingredients in the working solution, and play an important role in maintaining the proportion of tetrahydroalkylanthraquinone constant. The regeneration process is carried out preferably at 40-100° C., more preferably at 60-80° C. Of the total reacted working solution, preferably 5-30%, more preferably 10-20%, passes through the regeneration process.

MODE FOR THE INVENTION

The examples will now be described. The following examples are for illustrative purposes only and not intended to limit the scope of the present invention. In the examples and comparative examples, 2-amylanthraquinone is denoted as AAQ, 2-tetrahydroamylanthraquinone as THAAQ, 2-ethylanthraquinone as EAQ, 2-tetrahydroethylanthraquinone as THEAQ, side reaction products (inert ingredients) as Inerts, tetrahydroalkylanthraquinone as THAQ, alkylanthraquinone as AQ, tetrahydroalkylanthrahydroquinone as THAHQ, alkylanthrahydroquinone as AHQ, and hydroquinone (tetrahydroalkylanthrahydroquinone and alkylanthrahydroquinone) as HQ.

Example 1

In a mixture solvent, alkylanthraquinone and tetrahydroalkylanthraquinone are dissolved to a total concentration of 1.26 mol/L, as given in Table 1. As the mixture solvent, a 7:3 (w/w) mixture of alkylbenzene, tetrabuthyurea (solvent A) and a 7:1.5:1.5 (w/w/w) mixture of alkylbenzene, tetrabutylurea and diisobutylcarbinol (solvent B) are used. Alkylbenzene in the mixture solvents (solvent A and solvent B) consists of 16 wt % $C_9$-alkylbenzene and 84 wt % $C_{10}$-alkylbenzene. After adding the prepared working solution (25 mL), and then 0.3 g of 2% $Pd/Al_2O_3$ catalyst to a reactor, the working solution is reacted with hydrogen gas at 45° C. until hydroquinone (HQ) is crystallized. After the reaction, the working solution is separated from the catalyst and HQ crystal, and then a certain amount of the filtered working solution is added to distilled water. After oxidation by reacting with oxygen gas, the concentration of produced hydrogen peroxide is measured to determine HQ solubility.

The content of quinones in the working solution is determined by gas chromatography. HP-1701 column (30 m×250 μm×1.0 μm) is used, and the content of each component is quantized from the comparison of area with that of standard material.

Hydrogenation uptake refers to the time elapsed until a specific volume of hydrogen reacts. The volume of hydrogen that reacts with quinone is measured from the change of the level of the hydrogen metering tube. The time elapsed until a specific volume of hydrogen reacts is measured so that 50 mol % of the total quinone reacts.

The result is given in Table 1.

TABLE 1

|  | Example 1 | | | | | | |
| --- | --- | --- | --- | --- | --- | --- | --- |
|  | 1.1 | 1.2 | 1.3 | 1.4 | 1.5 | 1.6 | 1.7 |
| Solvent | A | A | B | A | A | B | A |
| AAQ (mol/L) | 0.353 | 0.265 | 0.265 | 0.176 | 0.302 | 0.302 | 0.340 |
| THAAQ (mol/L) | 0.529 | 0.617 | 0.617 | 0.706 | 0.706 | 0.706 | 0.794 |
| EAQ (mol/L) | 0.151 | 0.113 | 0.113 | 0.076 | 0.076 | 0.076 | 0.038 |
| THEAQ (mol/L) | 0.227 | 0.265 | 0.265 | 0.302 | 0.176 | 0.176 | 0.088 |
| Inerts (wt %) | 10.5 | 9.97 | 9.97 | 9.97 | 9.97 | 9.97 | 9.97 |
| Mol % ratio (amyl:ethyl) | 70:30 | 70:30 | 70:30 | 70:30 | 80:20 | 80:20 | 90:10 |
| Mol % ratio (THAQ:AQ) | 60:40 | 70:30 | 70:30 | 80:20 | 70:30 | 70:30 | 70:30 |
| HQ solubility (mol/L) | 0.881 | 0.884 | 0.899 | 0.889 | 0.891 | 0.903 | 0.894 |
| $H_2O_2$ equivalent[1]) ($H_2O_2$ g/L) | 30.0 | 30.1 | 30.6 | 30.2 | 30.3 | 30.7 | 30.4 |
| Hydrogenation uptake (min) | 50 | 45 | 40 | 40 | 55 | 50 | 60 |

[1])Theoretical grams of $H_2O_2$ that can be produced from 1 L of working solution Comparative Example 1

The following comparative experiment is carried out in order to compare HQ solubility and reaction rate of reduction for different quinones and mol % ratios. Alkylanthraquinone and tetrahydroalkylanthraquinone are dissolved in a 7:3 (w/w) mixture solvent of alkylbenzene, 16 wt % of $C_9$-alkylbenzene and 84 wt % of $C_{10}$ alkylbenzene, and tetrabutylurea to a total concentration of 0.788 mol/L, as in Table 2. Inert ingredients are not included in the working solution. HQ solubility is measured in the same manner as Example 1. The result is given in Table 2.

TABLE 2

|  | Comparative Example 1 | | | | | | | | |
| --- | --- | --- | --- | --- | --- | --- | --- | --- | --- |
|  | 1.1 | 1.2 | 1.3 | 1.4 | 1.5 | 1.6 | 1.7 | 1.8 | 1.9 |
| AAQ (mol/L) | 0.788 | 0.394 | 0.552 | 0.394 | 0.236 | 0.118 | 0.071 | 0 | 0 |
| THAAQ (mol/L) | 0 | 0.394 | 0 | 0 | 0 | 0.118 | 0.166 | 0 | 0 |
| EAQ (mol/L) | 0 | 0 | 0.236 | 0.394 | 0.552 | 0.276 | 0.166 | 0.788 | 0.394 |
| THEAQ (mol/L) | 0 | 0 | 0 | 0 | 0 | 0.276 | 0.386 | 0 | 0.394 |
| Mol % ratio (amyl:ethyl) | 100:0 | 100:0 | 70:30 | 50:50 | 30:70 | 30:70 | 30:70 | 0:100 | 0:100 |

TABLE 2-continued

| | Comparative Example 1 | | | | | | | | |
|---|---|---|---|---|---|---|---|---|---|
| | 1.1 | 1.2 | 1.3 | 1.4 | 1.5 | 1.6 | 1.7 | 1.8 | 1.9 |
| Mol % ratio (THAQ:AQ) | 0:100 | 50:50 | 0:100 | 0:100 | 0:100 | 50:50 | 70:30 | 0:100 | 50:50 |
| HQ solubility (mol/L) | 0.403 | 0.409 | 0.395 | 0.391 | 0.370 | 0.409 | 0.420 | 0.304 | 0.401 |
| Hydrogenation uptake (min) | 255 | 100 | 245 | 235 | 220 | 80 | 75 | 140 | 70 |

As seen in Table 2, HQ solubility increases when the proportion of AAQ is higher. At higher proportion of EAQ, HQ solubility decreases but reduction (hydrogenation) rate increases. When the proportion of THAQ is higher than that of AQ, HQ solubility increases and reduction rate increases.

Example 2

In order to compare the effect of inert ingredients in the working solution on HQ solubility and reaction rate of reduction, HQ solubility is measured in the same manner as Example 1, except that inert ingredients are not included in the working solution and that the total quinone concentration is set as 0.788 mol/L considering the solubility limit. Quinone composition and solubility measurement result are given in Table 3.

TABLE 3

| | Example 2 | | | | | |
|---|---|---|---|---|---|---|
| | 2.1 | 2.2 | 2.3 | 2.4 | 2.5 | 2.6 |
| AAQ (mol/L) | 0.386 | 0.221 | 0.166 | 0.110 | 0.189 | 0.213 |
| THAAQ (mol/L) | 0.166 | 0.331 | 0.386 | 0.441 | 0.441 | 0.496 |
| EAQ (mol/L) | 0.166 | 0.095 | 0.071 | 0.473 | 0.047 | 0.024 |
| THEAQ (mol/L) | 0.071 | 0.142 | 0.166 | 0.189 | 0.126 | 0.055 |
| Mol % ratio (amyl:ethyl) | 70:30 | 70:30 | 70:30 | 70:30 | 80:20 | 90:10 |
| Mol % ratio (THAQ:AQ) | 30:70 | 60:40 | 70:30 | 80:20 | 70:30 | 70:30 |
| HQ solubility (mol/L) | 0.504 | 0.510 | 0.512 | 0.513 | 0.596 | 0.603 |
| Hydrogenation uptake (min) | 140 | 90 | 85 | 80 | 90 | 95 |

As seen in Table 3, HQ solubility is higher and the reaction rate of reduction is faster when the mol % ratio of amyl:ethyl is 70:30 or higher and when the mol % ratio of THAQ:AQ is 70:30 or higher (Examples 2.3-2.6).

Through Examples 1 and 2 and Comparative Example 1, it can be seen that the presence of inert ingredients in the working solution remarkably improves HQ solubility and reaction rate of reduction. The reaction rate of reduction (hydrogenation uptake) depending on the compositions of the working solution is shown in FIG. 1.

Example 3

Stability of Working Solution

A working solution is prepared by dissolving AAQ (0.143 mol/L), THAAQ (0.366 mol/L), EAQ (0.075 mol/L) and THEAQ (0.140 mol/L) in a 7:3 (w/w) mixture solvent of alkylbenzene (16 wt % of $C_9$ alkylbenzene and 84 wt % of $C_{10}$ alkylbenzene) and tetrabutylurea. To the resultant working solution, 2.0 wt % catalyst (2.0% $Pd/Al_2O_3$) is added in a pressurized reactor, and reaction is performed for 72 hours at 65° C., under a hydrogen gas of 80 psig. The catalyst is removed from the reaction mixture, and the reduced working solution is oxidized to produce hydrogen peroxide. After removing hydrogen peroxide, the composition of the working solution is analyzed by gas chromatography. The result is given in Table 4.

Comparative Example 2

A working solution comprising AAQ (0.374 mol/L) and THAAQ (0.362 mol/L) is prepared. Stability of the working solution is measured in the same manner as Example 3. The result is given in Table 4.

Comparative Example 3

A working solution comprising AAQ (0.377 mol/L), THAAQ (0.150 mol/L), EAQ (0.145 mol/L) and THEAQ (0.061 mol/L) is prepared. Stability of the working solution is measured in the same manner as Example 3. The result is given in Table 4.

TABLE 4

| | Example 3 | | Comparative Example 2 | | Comparative Example 3 | |
|---|---|---|---|---|---|---|
| | Before | After | Before | After | Before | After |
| AAQ (mol/L) | 0.143 | 0.007 | 0.374 | 0.015 | 0.377 | 0.012 |
| THAAQ (mol/L) | 0.366 | 0.499 | 0.362 | 0.688 | 0.150 | 0.463 |
| EAQ (mol/L) | 0.075 | 0.004 | 0 | 0 | 0.145 | 0.020 |
| THEAQ (mol/L) | 0.140 | 0.192 | 0 | 0 | 0.061 | 0.165 |
| Total quinones (mol/L) | 0.724 | 0.701 | 0.736 | 0.702 | 0.733 | 0.660 |
| Mol % ratio (amyl:ethyl) | 74:26 | 75:25 | 100:0 | 100:0 | 75:25 | 75:25 |
| Mol % ratio (THAQ:AQ) | 70:30 | 99:1 | 49:51 | 98:1 | 29:71 | 96:4 |
| Inerts (wt %) | 9.85 | 10.34 | 8.40 | 9.25 | 9.70 | 11.61 |
| Increase of Inerts (%) | 0.49 | | 0.85 | | 1.91 | |

When comparing the working solution according to the present invention (Example 3) with those of the working solution comprising only AAQ and THAAQ (Comparative Example 2) and the working solution with a different THAQ:AQ mol % ratio (Comparative Example 3), Example 3 exhibits less production of inert ingredients under harsh conditions. Thus, it can be seen that the working solution according to the present invention has superior stability.

Example 4

Hydrogenation Uptake Depending on Water Content in Working Solution

A working solution is prepared by dissolving AAQ (0.143 mol/L), THAAQ (0.366 mol/L), EAQ (0.075 mol/L), THEAQ (0.140 mol/L) and Inerts (9.85 wt %) in a 7:3 (w/w) mixture solvent of alkylbenzene (16 wt % of $C_9$ alkylbenzene and 84 wt % of $C_{10}$ alkylbenzene) and tetrabutylurea. Water content in the prepared working solution is set as 0.1 wt %, 0.25 wt % and 0.35 wt %, using deionized water. The water content of the working solutions is measured using a Karl Fischer meter. Hydrogenation uptake is measured using the prepared working solutions.

Comparative Example 4

Working solutions with the same composition as Example 4 and water contents of 0 wt % and 1.0 wt % are prepared. Hydrogenation uptake is measured in the same manner as Example 4.

TABLE 5

|  | Example 4 | | | Comparative Example 4 | |
| --- | --- | --- | --- | --- | --- |
|  | 4.1 | 4.2 | 4.3 | 4.1 | 4.2 |
| Water content (wt %) | 0.1 | 0.25 | 0.35 | 0 | 1.0 |
| Hydrogenation uptake (min) | 30 | 27 | 28 | 45 | 120 |

As seen from Example 4 and Comparative Example 4, hydrogenation proceeds faster when there exists a certain quantity of water in the working solution. If the water content is 1.0 wt % or above, as in Comparative Example 4.2, aggregation of the catalyst occurs, thereby resulting in slow hydrogenation uptake (reaction rate of reduction).

Example 5

Using a small-scale apparatus for continuous preparation of hydrogen peroxide equipped with reduction, oxidation, extraction and recycling units, hydrogen peroxide is produced for one month while circulating a working solution. A working solution that has been used for preparation of hydrogen peroxide for a long period time in a plant is used. The working solution is prepared by dissolving AAQ (0.145 mol/L), THAAQ (0.366 mol/L), EAQ (0.168 mol/L), THEAQ (0.168 mol/L) and inert ingredients (9.85 wt %) in a 7:3 (w/w) mixture solvent of benzene and tetrabutylurea. The total amount of the working solution is 30 L and the circulation volume is controlled to be 15 L/hr. Operation is carried out so that the degree of hydrogenation is 90% based on the total tetrahydroalkylanthraquinone. Detailed description of each process is given below.

Reduction

The working solution is introduced into a reduction reactor equipped with a stirrer, a temperature-controllable jacket and a catalyst filtering apparatus. 2.0% Pd/$Al_2O_3$ catalyst with an average particle size of 50 m is added in an amount of 2.0 wt % based on the working solution, and reaction is carried out continuously while maintaining reaction temperature at 45° C. and hydrogen gas pressure at 20 psig.

Oxidation

The reduced working solution and air are reacted in a multi-stage counter-current oxidation tower equipped with a finely perforated tray while maintaining temperature at 55° C. and pressure at 80 psig.

Extraction

Hydrogen peroxide is extracted from the oxidized working solution using a common extraction apparatus. After the extraction process, the oxidized working solution is recycled to the reduction process.

Regeneration

A regeneration process is omitted in order to observe the change of the composition of the working solution.

Change of the composition and physical properties of the working solution is observed after a month of production of hydrogen peroxide. The result is given in Table 6.

Specific gravity of the working solution is measured using a chain balance. Viscosity of the working solution is determined as follows. A sample is put in a viscometer tube maintained at constant temperature in a water bath, and the time required to pass through the narrow tube is measured. The viscosity is calculated from the measured time and the specific gravity.

Example 6

Hydrogen peroxide is produced in the same manner as Example 5 except that the working solution comprises AAQ (0.142 mol/L), THAAQ (0.531 mol/L), EAQ (0.028 mol/L), THEAQ (0.11 mol/L) and inert ingredients (8.4 wt %). Change of the composition and physical properties of the working solution is observed after a month of production of hydrogen peroxide. The result is given in Table 6.

Comparative Example 5

Hydrogen peroxide is produced in the same manner as Example 5 except that the working solution comprises AAQ (0.337 mol/L), THAAQ (0.143 mol/L), EAQ (0.171 mol/L), THEAQ (0.072 mol/L) and inert ingredients (9.7 wt %). Operation is carried out in the same manner as Example 5, without considering degree of hydrogenation based on the quantity of tetrahydroalkylanthraquinone. Change of the composition and physical properties of the working solution is observed after a month of production of hydrogen peroxide. The result is given in Table 6.

Comparative Example 6

Hydrogen peroxide is produced in the same manner as Example 5 except that the working solution comprises AAQ (0.018 mol/L), THAAQ (0.044 mol/L), EAQ (0.201 mol/L), THEAQ (0.461 mol/L) and inert ingredients (7.55 wt %). Operation is carried out while maintaining the maximum degree of hydrogenation allowed by the solubility limitation. Change of the composition and physical properties of the working solution is observed after a month of production of hydrogen peroxide. The result is given in Table 6.

TABLE 6

|  | Example 5 | | Example 6 | | Comparative Example 5 | | Comparative Example 6 | |
| --- | --- | --- | --- | --- | --- | --- | --- | --- |
|  | Start | One month later | Start | One month later | Start | One month later | Start | One month later |
| AAQ (mol/L) | 0.143 | 0.142 | 0.134 | 0.130 | 0.377 | 0.329 | 0.018 | 0.017 |
| THAAQ (mol/L) | 0.366 | 0.368 | 0.546 | 0.548 | 0.150 | 0.174 | 0.044 | 0.043 |
| EAQ (mol/L) | 0.075 | 0.071 | 0.024 | 0.022 | 0.145 | 0.137 | 0.201 | 0.200 |
| THEAQ (mol/L) | 0.140 | 0.141 | 0.108 | 0.109 | 0.061 | 0.067 | 0.461 | 0.461 |
| Total quinones (mol/L) | 0.724 | 0.722 | 0.814 | 0.809 | 0.732 | 0.700 | 0.724 | 0.721 |
| Inerts (wt %) | 9.85 | 9.87 | 8.40 | 8.46 | 9.70 | 10.35 | 7.55 | 7.58 |
| Water content (wt %) | 0.23 | 0.25 | 0.21 | 0.24 | 0.22 | 0.24 | 0.23 | 0.25 |
| Mol % ratio (amyl:ethyl) | 74:26 | 74:26 | 86:14 | 86:14 | 72:25 | 74:26 | 10:90 | 9:91 |
| Mol % ratio (THAQ:AQ) | 70:30 | 71:29 | 81:19 | 81:19 | 29:71 | 35:65 | 70:30 | 71:29 |
| Specific gravity (35° C.) | 0.9371 | 0.9372 | 0.9455 | 0.9457 | 0.9370 | 0.9368 | 0.9305 | 0.9302 |
| Viscosity (35° C.) | 4.31 | 4.33 | 4.82 | 4.84 | 4.25 | 4.26 | 4.17 | 4.16 |
| Distribution coefficient | 81.7 | 81.9 | 76.7 | 75.3 | 77.1 | 75.3 | 71.4 | 69.8 |
| $H_2O_2$ (g/L) produced per 1 L of working solution | 15.2 | | 20.1 | | 14.2 | | 12.5 | |

When comparing Example 5 and Comparative Example 5 (mol % ratio of THAQ:AQ is different), the quantity of hydrogen peroxide produced per 1 L of working solution for one month is almost similar. However, Comparative Example 5 shows significantly increased quantity of inert ingredients, side reaction products of active quinones. This indicates that, in Comparative Example 5, alkylanthraquinone participates in reduction, thereby facilitating side reactions of active quinones. Examples 5 and 6 show little changes in specific gravity, viscosity and distribution coefficient, which are related to easiness of operation.

In spite of high productivity of hydrogen peroxide, Example 6 exhibits fewer side reaction products of quinones since only tetrahydroalkylanthraquinone participates in reduction. Comparative Example 6 exhibits lower productivity of hydrogen peroxide because the degree of hydrogenation (reduction) cannot be increased due to low HQ solubility of the working solution.

While the exemplary embodiments have been shown and described, it will be understood by those skilled in the art that various changes in form and details may be made thereto without departing from the spirit and scope of the invention as defined by the appended claims.

In addition, many modifications can be made to adapt a particular situation or material to the teachings of this disclosure without departing from the essential scope thereof. Therefore, it is intended that this invention not be limited to the particular exemplary embodiments disclosed as the best mode contemplated for carrying out this invention, but that this invention will include all embodiments falling within the scope of the appended claims.

The invention claimed is:

1. A method for preparation of hydrogen peroxide through an anthraquinone recycle process of reducing and oxidizing a working solution comprising 2-alkylanthraquinone, 2-tetrahydroalkylanthraquinone and an organic solvent, wherein 65-95 mol % of the alkyl group of 2-alkylanthraquinone and 2-tetrahydroalkylanthraquinone is amyl and the remaining 5-35 mol % of the alkyl group is ethyl, and the molar ratio of 2-alkylanthraquinone to 2-tetrahydroalkylanthraquinone is from 4:6 to 1:9, wherein inert ingredients produced from the side reaction of 2-alkylanthraquinone are included in the working solution in an amount of 3-20 wt %.

2. The method for preparation of hydrogen peroxide according to claim 1, wherein the amyl group comprises tert-amyl and iso-sec-amyl at a molar ratio of 7:3 to 9:1.

3. The method for preparation of hydrogen peroxide according to claim 1, wherein water is further contained in the working solution in an amount of 0.05-0.5 wt %.

4. The method for preparation of hydrogen peroxide according to claim 1, wherein the working solution comprises 17-34 wt % of 2-alkylanthraquinone and 2-tetrahydroalkylanthraquinone.

5. The method for preparation of hydrogen peroxide according to claim 1, wherein the degree of hydrogenation during the reduction of the working solution is controlled to be 70-100 mol % on the basis of 2-tetrahydroalkylanthraquinone.

6. The method for preparation of hydrogen peroxide according to claim 1, wherein the organic solvent is a mixture of a nonpolar solvent, C9-C10 alkylbenzene, and at least one polar solvent selected from a group consisting of diisobutylcarbinol, tris-(2-ethylhexyl) phosphate, methylcyclohexyl acetate, N-butylcaprolactam and tetrabutylurea.

7. The method for preparation of hydrogen peroxide according to claim 2, wherein the degree of hydrogenation during the reduction of the working solution is controlled to be 70-100 mol % on the basis of 2-tetrahydroalkylanthraquinone.

8. The method for preparation of hydrogen peroxide according to claim 1, wherein the degree of hydrogenation during the reduction of the working solution is controlled to be 70-100 mol % on the basis of 2-tetrahydroalkylanthraquinone.

9. The method for preparation of hydrogen peroxide according to claim 3, wherein the degree of hydrogenation during the reduction of the working solution is controlled to be 70-100 mol % on the basis of 2-tetrahydroalkylanthraquinone.

10. The method for preparation of hydrogen peroxide according to claim 4, wherein the degree of hydrogenation during the reduction of the working solution is controlled to be 70-100 mol % on the basis of 2-tetrahydroalkylanthraquinone.

11. A composition for preparation of hydrogen peroxide comprising 2-alkylanthraquinone, 2-tetrahydroalkylanthraquinone and an organic solvent, wherein 65-95 mol % of the alkyl group of 2-alkylanthraquinone and 2-tetrahydroalkylanthraquinone is amyl and the remaining 5-35 mol % of the alkyl group is ethyl, and the molar ratio of 2-alkylanthraquinone to 2-tetrahydroalkylanthraquinone is from 4:6 to 1:9, wherein inert ingredients produced from the side reaction of 2-alkylanthraquinone is contained in the composition in an amount of 3-20 wt % of the working solution.

12. The composition for preparation of hydrogen peroxide according to claim 11, wherein the amyl group comprises tert-amyl and iso-sec-amyl at a molar ratio of 7:3 to 9:1.

13. The composition for preparation of hydrogen peroxide according to claim 11, wherein water is further contained in the composition in an amount of 0.05-0.5 wt % of the working solution.

14. The composition for preparation of hydrogen peroxide according to claim 11, which comprises 17-34 wt % of 2-alkylanthraquinone and 2-tetrahydroalkylanthraquinone of the working solution.

15. The composition for preparation of hydrogen peroxide according to claim 11, wherein the organic solvent is a mixture of a nonpolar solvent, C9-C10 alkylbenzene, and at least one polar solvent selected from a group consisting of diisobutylcarbinol, tris-(2-ethylhexyl) phosphate, methylcyclohexyl acetate, N-butylcaprolactam and tetrabutylurea.

16. The composition for preparation of hydrogen peroxide according to claim 11, wherein said composition has a specific gravity of 0.89-0.97.

* * * * *